(No Model.) 7 Sheets—Sheet 1.

T. DUNCAN.
ELECTRIC METER.

No. 551,436. Patented Dec. 17, 1895.

Witnesses
John J. Muir
J. E. Dalton

Thomas Duncan Inventor
By his Attorney Wm. Sturgis (No Model.) 7 Sheets—Sheet 3.

T. DUNCAN.
ELECTRIC METER.

No. 551,436. Patented Dec. 17, 1895.

Witnesses
John J. Muir
J. E. Dalton

Thomas Duncan Inventor
By his Attorney Wm. Sturges

(No Model.) 7 Sheets—Sheet 5.

T. DUNCAN.
ELECTRIC METER.

No. 551,436. Patented Dec. 17, 1895.

Witnesses
John J. Muir
J. E. Dalton Thomas Duncan Inventor
By his Attorney Wm Sturgis (No Model.) 7 Sheets—Sheet 6.

T. DUNCAN.
ELECTRIC METER.

No. 551,436. Patented Dec. 17, 1895.

Witnesses
Thomas Duncan Inventor
By his Attorney Wm Sturgis (No Model.) 7 Sheets—Sheet 7.

T. DUNCAN.
ELECTRIC METER.

No. 551,436. Patented Dec. 17, 1895.

Witnesses
John J. Muir
J. E. Dalton

Thomas Duncan Inventor
By his Attorney Wm Sturgis

UNITED STATES PATENT OFFICE.

THOMAS DUNCAN, OF FORT WAYNE, INDIANA.

ELECTRIC METER.

SPECIFICATION forming part of Letters Patent No. 551,436, dated December 17, 1895.

Application filed July 11, 1895. Serial No. 555,638. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters, of which the following is a specification.

My invention relates to that class of meters known as "induction motor-meters," for measuring or integrating the number of coulombs consumed or used on alternating-current systems of distribution. Its object is to overcome a defect that is present in all meters known to me of this type at the present time.
This defect is the dissipation of too much energy as $C^2 R$ loss in the series field-coils which usually carry the current to be measured.

In my improvement I have shown a method of obtaining a torque equal to the best meter upon the market of this induction type, and only use about one-half the length of wire and one-half the number of turns in the series coils to accomplish it, thereby reducing the loss in the meter to the smallest possible amount.

My improvement also reduces the choke or impedance set up in the said series field-coils. The reduction of this impedance in said series coils will prove valuable by its allowing the incandescence of the lamps to remain constant, and not dim them down as the meter is loaded, as is too often the case with other meters. Since this impedance varies directly as the current and as the square of the number of turns in the series coils, it is at once evident that its influence as compared with other meters is negligible when the number of turns have been reduced to one-half.

I also find that my improvement eliminates the humming noise so troublesome with alternating-current meters, being a fault that has caused central-station men to remove meters from private dwellings in many cases. This reduction of noise is due to the density of field-flux being only one-half that of any other meter, or in other words, my improved meter when upon full load has only the same density of flux as the best induction-meter upon the market at one-half load.

Figures 1 to 40, inclusive, serve to show the manner in which I carry out my invention, and in which similar characters refer to similar parts throughout the several sheets.

Fig. 1 is a front elevation of my improved meter, while Fig. 2 shows the same in section, with another sectional plan view shown in Fig. 3. Figs. 29, 30, 31, and 32 show various forms of the sheet-iron punchings which may be used in building up the core of the diverter 40. The recess upon the periphery of the hole at the center and into which a pin fits is to prevent slipping of the diverter when in place upon the upright tube which carries said pin and connects it with the lever-arm. Fig. 38 shows a form of armature which consists of a spiral of iron wire 44 placed upon the bent arms of a spider 43, while

The principal elements employed in the construction of my improved meter are a series coil or coils of insulated wire connected in the main circuit and through which the main portion or all of the current passes for the translating devices; a diverter which consists of one or more coils of finer wire wound upon a laminated iron core and placed within the field of said series coil or coils, and having the terminals or ends of its coil connected in shunt to the terminals of the said series or thick-wire coils; a cylindrical armature mounted upon a suitable spindle and revoluble between the said series coils and diverter;

a winged fan secured to the same spindle as the revoluble armature, and a registering-train for recording the number of revolutions made by the said armature.

Figure 1:
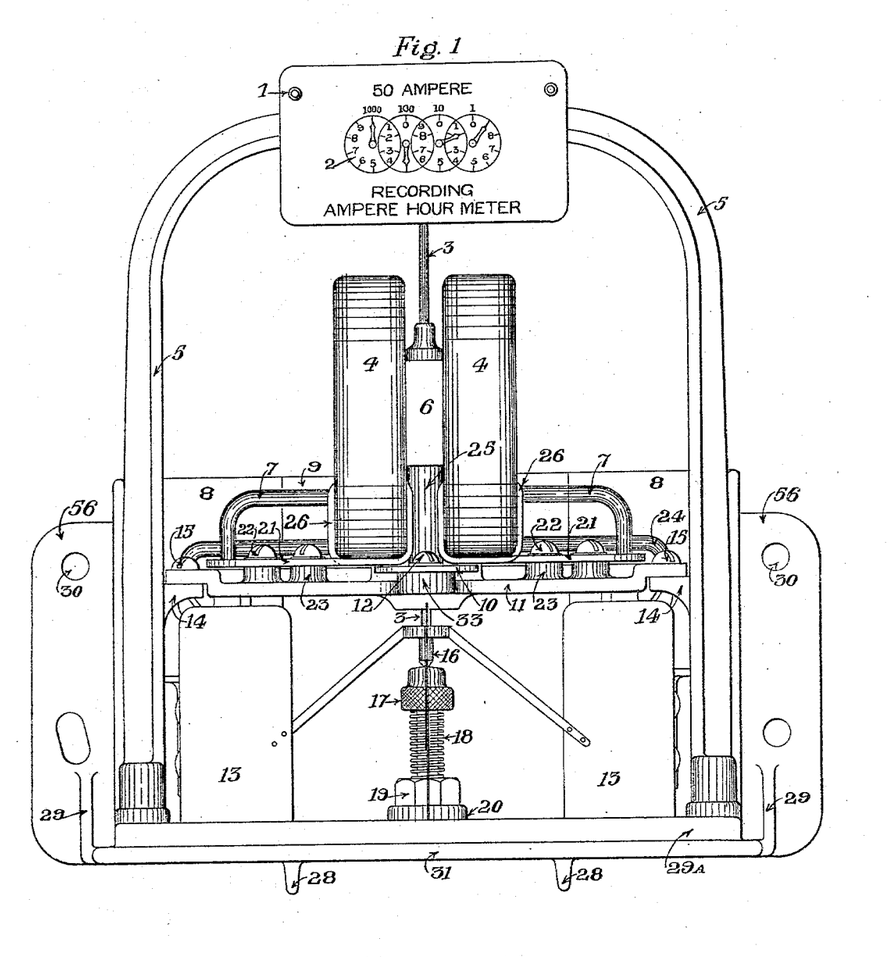
Figure 2:
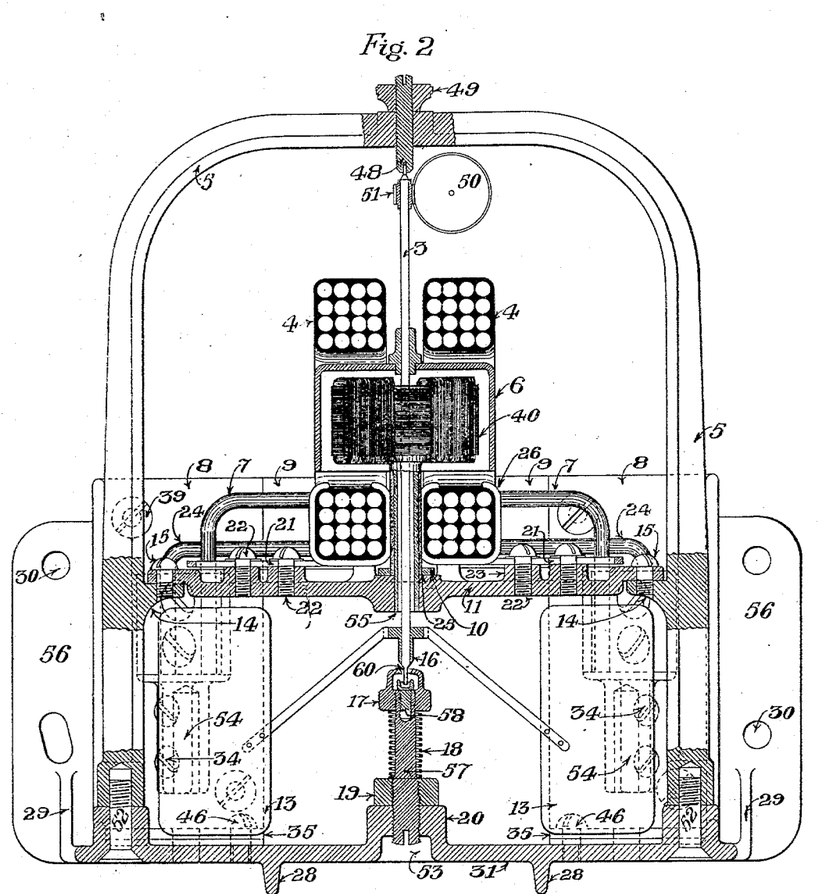
Figure 3:
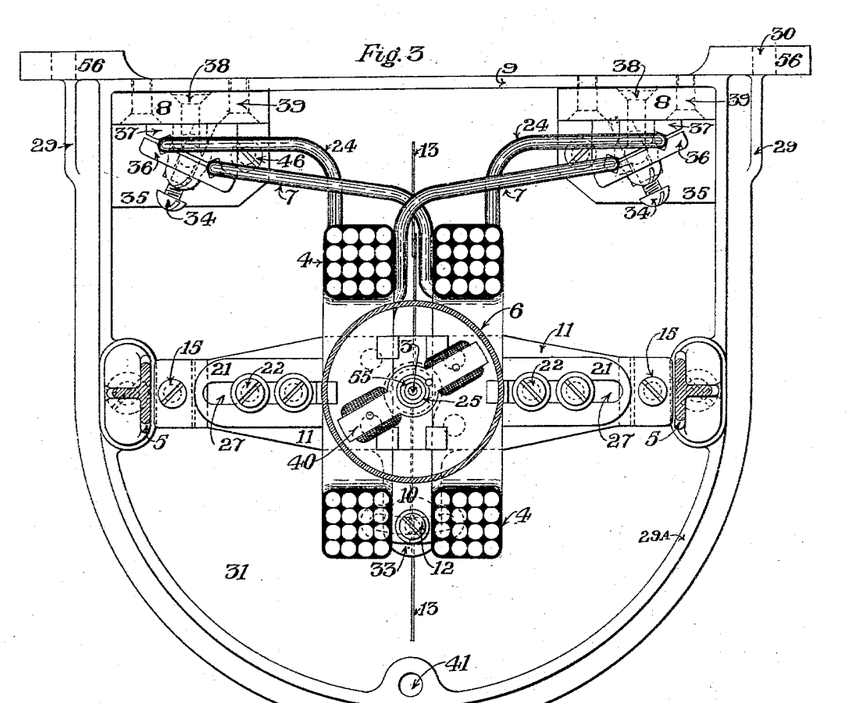

In constructing my improved meter I employ a cast base 31, which is provided with strengthening-ribs 28 and 29, a boss 20 for supporting the jewel-post 57, the lugs 56 and the back 9. Resting upon this base is also a cast arch 5, which is secured upon bosses by the screws 52. This arch carries upon its two brackets 14 a cast part 11 for supporting the series coils and diverter, a bearing at the top into which the upper end of the spindle enters, and the registering train or dial. The thick-wire or series coils are shown to be connected in multiple, Fig. 3, and their terminals 7 and 24 secured to the binding-posts 37, which also comprise the clamping-plate 36 and the screws 34 for tightening said coil-terminals between the parts 36 and 37. The connections with the circuit are made through the base of the meter and enter the hole 54 of the binding-post, in which the leads are secured by the screws 34. These binding-posts are insulated from the back 9 by the blocks of porcelain 8, and are screwed thereto by the screws 38. The heads of these screws are countersunk to prevent their touching the back 9. The porcelain blocks 8 are screwed to the back 9 with the screws 39, which must also be countersunk or have a piece of mica cemented upon their heads to prevent their making contact with the binding-post 37. Underneath these binding-posts is placed a punched sheet of insulating material 35, and having a hole through which the inleading wire from the circuit passes, which prevents it from coming in contact with the base. This insulating-punching is screwed to the base with the screw 46.

The series coils 4 are secured to the casting 11 by the punched clamps 21, with their upright gripping extensions 26, which hold the coils firmly in place. The slot 27 in this clamp allows the coils to be adjusted to the proper position when they are rigidly fastened to the bosses 23 of the casting 11 by the set-screws and washers 22.

The armature 6 which is located within the series coils 4 is mounted upon the spindle 3, said spindle resting upon the jeweled bearing 58, which is at the top of the stud 57 and placed within the cap 17, which prevents the entrance of dust, as well as serving to raise said spindle up out of the said jewel when not in use. The four-winged fan 13 is of the ordinary construction with the exception of the beveled part 16 which is for the cap 17 to engage with for raising the spindle. The spiral spring 18 is to keep the cap in any position in which it may be placed upon the threaded part on top of the post 57 and upon which it turns.

The space 53 which is directly underneath the jewel-post 57 is for filling with wax or other suitable material to prevent customers from tampering with said post. After adjusting the jewel-post it is tightened in the boss 20 with the jam-nut 19.

The lugs 56 are provided with suitable holes 30 for securing the meter to its support when being installed.

For transmitting the revolutions of the spindle to the registering-train 2 a worm 51 is used which meshes into the worm-wheel 50. The jam-nut 49 holds the upper bearing 48 in the cast arch 5.

The diverter 40 which is placed within the armature 6 is mounted upon a tube 25 which is soldered to the lever-arm 10 and adjustable for varying the angle of the diverter. When the proper angle has been obtained this lever-arm is screwed fast to the extension 33 with the set-screw and washer 12. In order that the diverter and its tube which connects it with the lever-arm for adjustment may be kept in a vertical position, a second tube 55 is used and which is soldered or otherwise suitably secured to the cast plate or support 11. This tube extends upward into the diverter and makes an excellent bearing upon which to adjust it until the requisite speed or torque has been obtained by varying the angle of the lever-arm 10 which controls it.

The registering-train 2 may be made to read in either lamp-hours or ampère-hours. Said train has two pins 1 which extend out from the face of the dial to about the same distance as the hands or pointers, to prevent the cover of the meter from striking and bending said pointers, which often results in their stopping the meter, this being a source of considerable annoyance in handling a great many meters.

Figure 6:
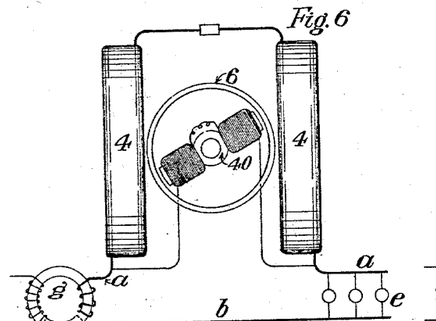

Fig. 6 shows the method of connecting the series coils 4 in the main circuit $a$ and $b$, the current being received from the transformer $g$ and feeding the lamps $e$. The diverter 40 in this figure is shown to be at about an angle of thirty degrees, but gives the best results when said angle is forty-five degrees. This diverter consists of two coils of insulated wire, one placed upon each end of the laminated iron core 40, and connected in series with each other, the remaining or outer terminals being connected in shunt or parallel to the series field or thick-wire coils 4. When an impulse of current comes from the transformer $g$, it is divided, the greater part flowing through the series coils 4 and the remainder through the diverter-coils. Since there is practically no impedance in the series coils 4, as hereinbefore mentioned, the flow of current from $g$ will be instantaneous or in step with the electromotive force; but the current which traverses the diverter-coils will lag behind the current in the coils 4, thereby producing a difference of phase between these two fields which causes the aluminum cylinder or closed secondary 6 to revolve in a direction which is counter-clockwise, due to the well-known shifting-field effect. This would also be true if the iron core was removed from these diverter-coils and placed in a separate coil in series with them, so as to give this diverter-circuit the necessary lag or impedance; but by so doing the speed would be very perceptibly reduced; but by using the iron core it develops another force which is added to that produced by the aforementioned shifting-field effect—viz., a repulsive force set up between the series coils 4 and the aluminum drum 6 which drives or repels said drum around in the same direction as that in which the shifting-field drives it, thereby increasing the efficiency to a very perceptible degree. This repelling force is established by the flux from the coils 4 cutting obliquely through the aluminum drum 6 in its path through said iron core of the diverter, causing it to revolve in the manner stated. When the flux of the series or thick-wire field passes through the coils of the diverter, it also develops a secondary current in these coils, which will be in step with and have the same direction of flow as the current shunted from the terminals of the coils 4 on the side of the circuit $a$. The torque is zero when the diverter is in the same axial plane as the series coils and at a maximum when at an angle of forty-five degrees. If moved around to ninety degrees, it still rotates, but with diminished speed, due to the repulsive force between the series coils 4 and the closed secondary 6 having disappeared. For this reason it gives the best results when the diverter is at the angle of forty-five degrees, since the repelling force moves toward the axis of rotation when the angle is varied on either side of forty-five degrees, being exactly through the center when at zero and ninety degrees. Another reason why the torque is reduced when the diverter stands at right angles is that the diverter-coils are not cut by the series field-flux, therefore do not have the secondary current induced in them which works in conjunction with the current derived from the terminals of the series coils 4.

Figure 7:
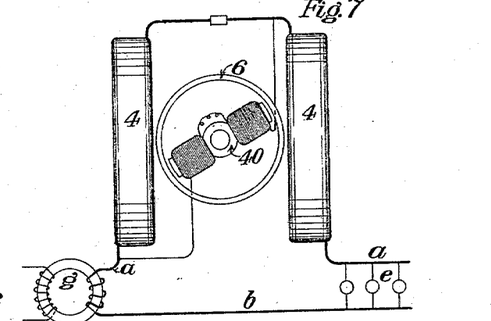

Fig. 7 shows the same arrangement of the coils 4, the diverter-terminals being connected or shunted around only one of the series coils.

Figure 8:
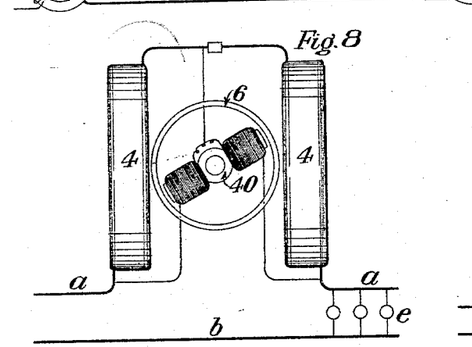

Fig. 8 is similar to Fig. 6 in that its diverter-terminals are connected to the terminals of the coils 4, but has also another wire connecting the center of said diverter-coils with the center of the series coils in the manner shown. This arrangement is for balancing the forces acting upon the drum 6, in case that either the two coils 4 or the diverter-coils respectively should happen to have or acquire a different impeditive value from each other, which would produce resulting complex shifting fields that might interfere with the regulation and accuracy of the device as a measuring-instrument.

Figure 9:
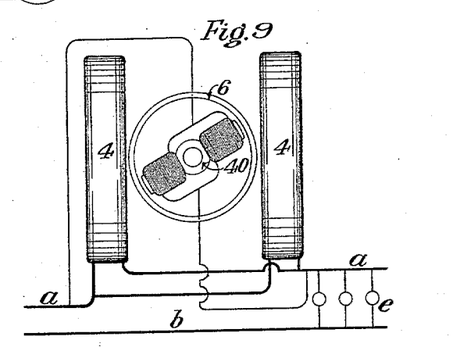

In Fig. 9 the series coils 4 are connected in multiple to each other, as are also the terminals of the diverter-coils.

Figures 10, 11:
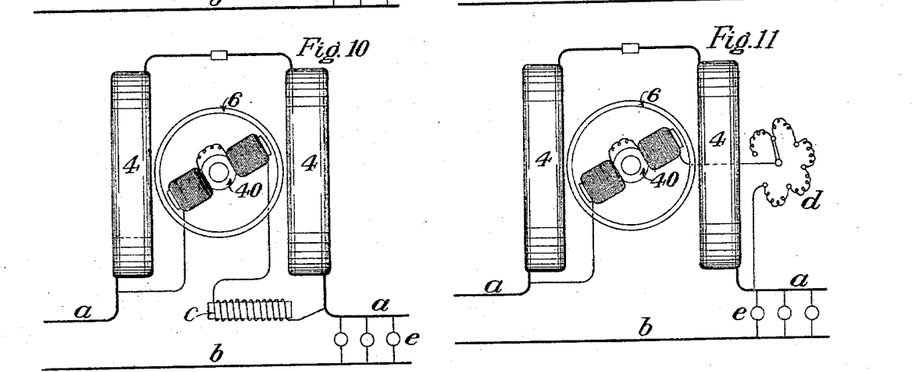

Fig. 10 has an impedance-coil connected in series with the diverter-coils for varying the speed of the armature by the adjustment of the iron core contained and shown within the coil or winding surrounding it. I have also made use of this arrangement in measuring the watts consumed by connecting one of the terminals of this diverter-circuit to the other or $b$ side of the mains. Finding that the best results are obtained when the resistance of these diverter-coils and their impedance bear a certain relation to each other I use an adjustable resistance $d$ in series with them, as shown in Fig. 11, also a combination of both the said resistance $d$ and the impedance-coil $c$ of Fig. 10.

Figure 12:
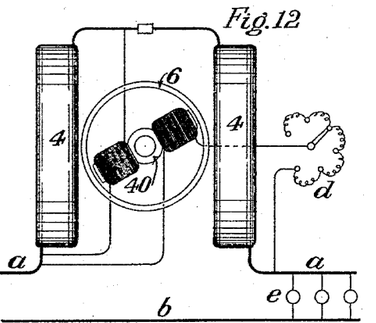

In Fig. 12 is shown one of the diverter-coils connected in series with a variable resistance $d$, while the other is connected or shunted around only one of the coils 4.

Figure 13:
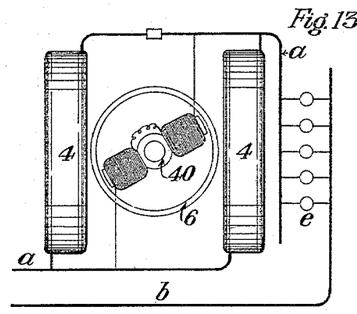

Fig. 13 is similar to Fig. 7 with the exception of showing the series coils in multiple to each other.

Figure 14:
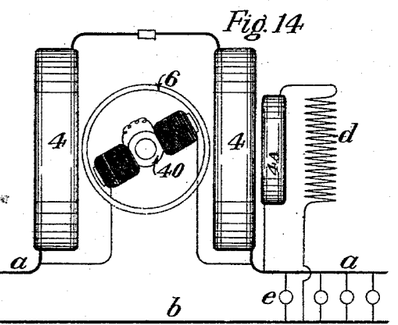

For the purpose of overcoming the friction of the moving parts of the meter I have used the method shown in Fig. 14, in which a supplemental coil $4^A$ is used to produce an initial field or torque. This coil or supplemental exciting-field is connected in series with a non-inductive resistance $d$ and the remaining terminals connected to the mains $a$ and $b$ in multiple, as shown. It is necessary for the successful operation of the meter that there be little or no self-induction in this supplemental coil $4^A$.

Figure 15:
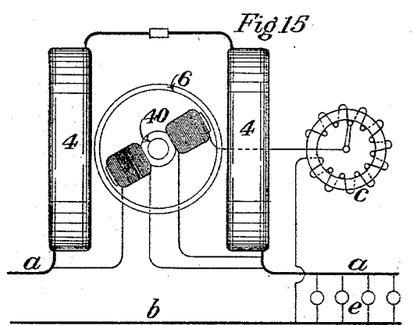

Fig. 15 shows another method of connecting the diverter 40 by shunting the terminals of one of the coils around the series field-coils, while the remaining coil is placed in series with a variable reactive coil $c$, the ends being connected across the mains $a$ and $b$. By varying the amount of impedance in the coil $c$ the speed of the cylinder 6 is adjusted until it is correct, thereby making this arrangement very simple and effective in calibrating the meter.

Figure 16:
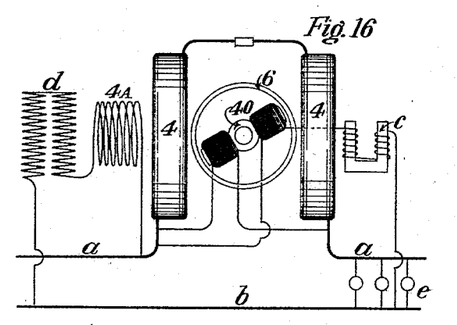

Fig. 16 is much similar to Fig. 15, but has added the supplementary exciting-coil $4^A$ of Fig. 14. The adjusting of $c$ may be accomplished by either moving the core in or out.

Figure 17:
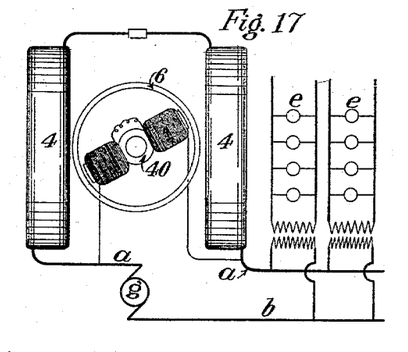

For measuring the output of central stations the series coils may be connected in the main line, as shown in Fig. 17, between the dynamo $g$ and the transformers or other translating devices $e$.

Figure 18:
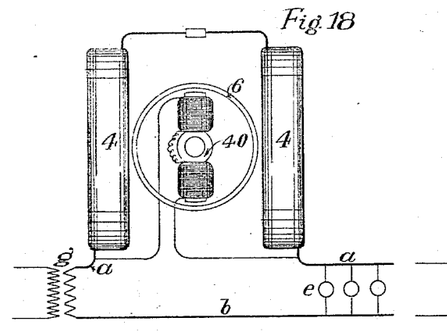

Fig. 18 shows the diverter-coils at right angles and where only the shifting field aforementioned causes the aluminum drum or cylindrical secondary 6 to rotate. However, if I employ an iron cylinder with the series coils and diverter, as shown, I obtain the best torque with this magnetic metal at this angle. Another distinction between the two armatures is that they will revolve in opposite directions. This is due to the poles of the two armatures differing in the following manner: When an iron armature or cylinder is used, its induced magnetic poles will be opposite in sign to that of the poles producing or inducing them, while if a cylinder of non-magnetic metal—such as copper, aluminum, or silver—be used the induced poles which result from the flow of secondary currents developed in the cylinder will have signs similar to those of the magnetic poles which developed these secondary currents and of which they are the result, thereby setting up a "repulsive" force between the induced current-poles and their inducing-poles, in contradistinction from the "attractive" force displayed between the "direct-induced" magnetic poles in the iron cylinder and said inducing-poles, they being opposite in sign. Therefore, it is very evident that if rotation is produced in one direction with an aluminum armature it will be reversed if an iron one is substituted. Notwithstanding the foregoing, the iron cylinder can be made to revolve in the same direction as the aluminum one by reversing the terminal connections of the diverter-coils, thus changing the direction of the current through them from the line $a$ at the terminals of the coils 4. I have also used this form for measuring the watts expended in single-phase alternating-current work by placing the terminals of the diverter 40 across the mains $a$ and $b$ and subjecting them to the drop of same, thereby representing the electromotive force by the field produced. In its application to this use I employ a reactive coil $c$ of any suitable form to obtain the proper phase and speed. In two-phase work I have also used this form by passing the currents flowing in the common return through the coils 4 and joining the terminals of the diverter-coils to the outer leads of the system, with a variable resistance in series therewith to determine the speed. It is not necessary that the iron core be used in two-phase work, since the angle of lag between this diverter and the series coils is established and maintained at ninety degrees by the generator.

Figure 19:
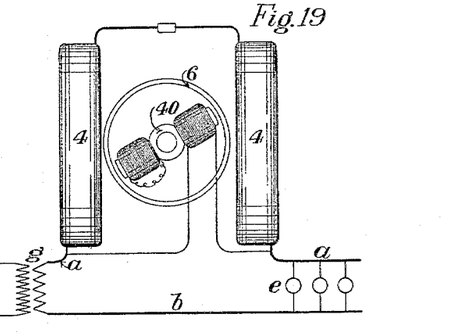

Fig. 19 has one of the diverter-coils closed upon itself, the other being connected in the usual manner.

Figure 20:
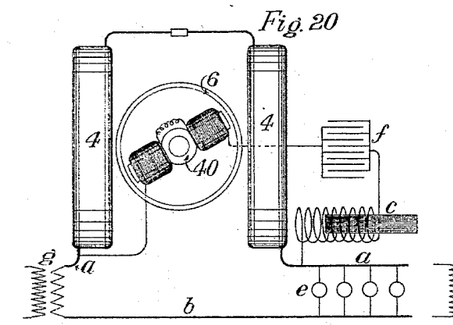
Figure 21:
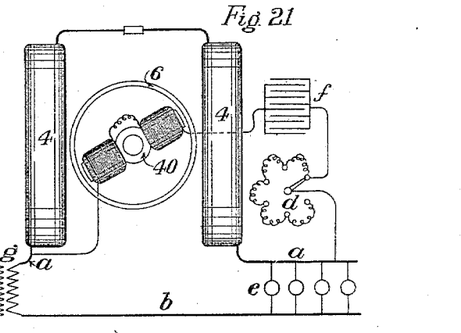

Fig. 20 shows a condenser $f$ and impedance-coil $c$ in series with the coils upon the diverter 40, while in Fig. 21 a variable resistance $d$ is used in combination with the condenser $f$ instead of a reactive coil $c$, as in Fig. 20.

I do not wish to be understood as limiting myself to the methods of applying condensers and impedance-coils as herein shown or described, as other methods are well known to those versed in the art.

Figure 22:
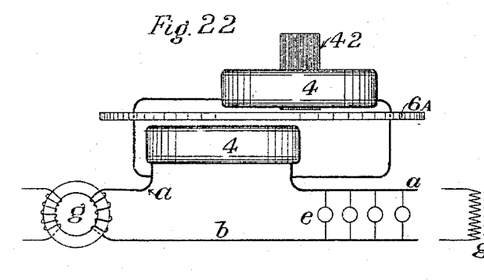
Figs. 22 and 23 show a disk employed in lieu of a cylindrical armature.

Fig. 22 shows an aluminum disk $6^A$ mounted so as to rotate between the series coils 4, the upper of which has a laminated iron core placed within it.

Figure 23:
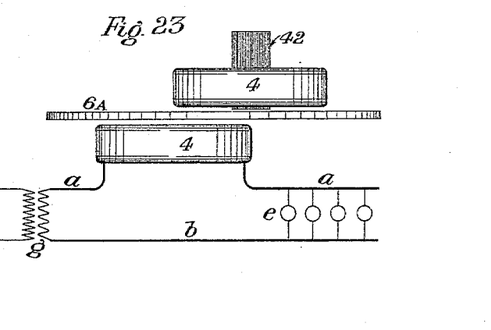
Figure 24:
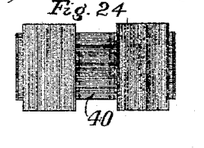
Fig. 24 is a side elevation, and Fig. 28 a plan view, of the diverter.
Figure 25:
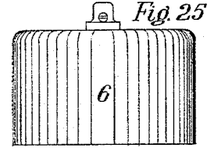
Fig. 25 shows a cylindrical armature in the form of an inverted cup, with a sectional view of same shown in Fig. 26.
Figure 26:
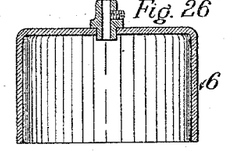
Figure 27:
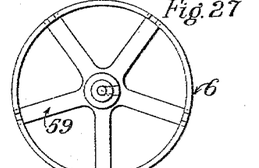
Figs. 27 and 33 show another form of cylinder which is provided with a spider 59.
Figure 28:
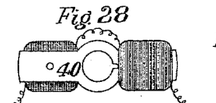
Figure 29:
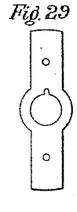
Figure 30:
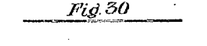
Fig. 30 is a side view of the stamping shown in Fig. 29.
Figure 31:
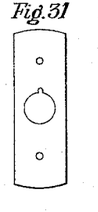
Figure 32:
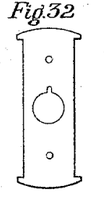
Figure 33:
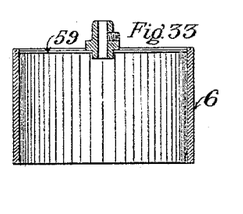
Figure 34:
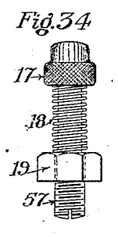
Figs. 34 and 35 show the jewel post or stud upon which rests the spindle of the meter.

In Fig. 23 the lower coil is in series with the main feeder, the upper one being closed upon itself.

Figure 4:
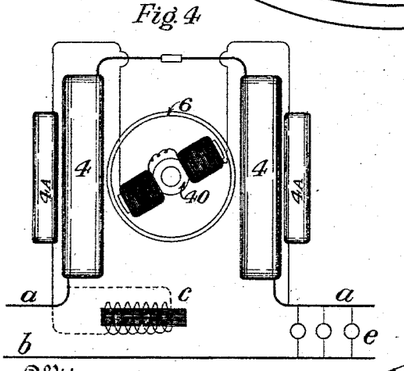
Figs. 4, 5, 6, 7, 8, 9, 10, 11, 12, 13, 14, 15, 16, 17, 18, 19, 20, and 21 illustrate some of the various methods of connecting and operating my improvement.
Figure 5:
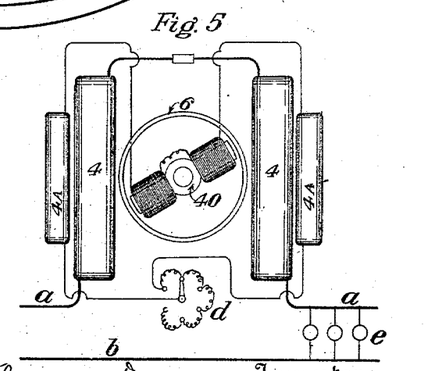

Another method of obtaining rotation of the drum 6 is shown in Fig. 5. In this combination no metallic connections with the coils 4 or lines $a$ and $b$ are used. The coils of the diverter 40 are connected in series with the coils $4^A$, all three of which act as a single closed secondary circuit through the adjustable resistance $d$. In Fig. 4 these coils $4^A$ and those of the diverter 40 have their terminals shunted around the coils 4, and may be connected in series with the impedance C if necessary, as shown by the dotted lines.

Figure 38:
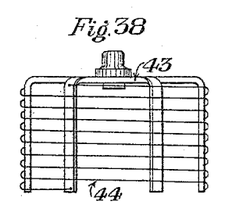
Figure 39:
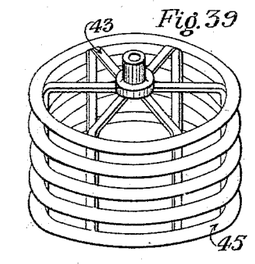
Fig. 39 shows rings of the same metal placed upon the spider or vertically-supporting arms of same.

The arrangement of coils shown in Fig. 18 I find to work well with the armatures shown in Figs. 38 and 39.

Figure 35:
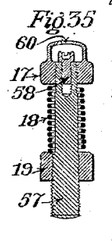
Figure 36:
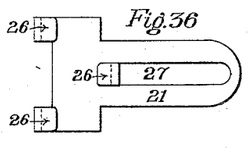
Figs. 36 and 37 are views of the clamp used to hold the series coils in position.
Figure 37:
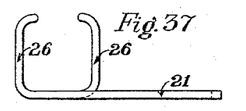

One of the improved mechanical features of my invention is in the construction of the jewel-post, Fig. 35, which consists in having a separable part 58 in which is set the jewel, and can be screwed in or out of the stud 57 very easily. This will fill a long-felt want to users of electric meters who have to change damaged jewels very often, either on account of their wearing out or cracking in handling. If a new jewel is to be inserted in a meter, all that is necessary is to loosen the jam-nut 19, (see Fig. 2,) holding it with the spring 18 and cap 17 between the fingers and thumb, when the post 57 may be easily removed with a screwdriver from the bottom at the recess 53. After removal, the setting 58 can be exchanged for a new one and returned in a few moments.

Figure 40:
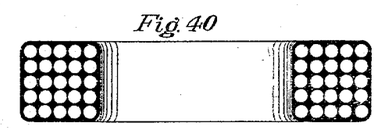
Fig. 40 is a series coil in section showing the form of winding which I have found to give the best result.

Fig. 40 represents in section the form of coil with which I am enabled to obtain the best results. It is wound so that the number of turns per layer is equal to the number of layers, thereby giving a square section or that of a rectangle with all its sides equal, as shown. It will be noted that in Figs. 1, 2, and 3 the field-coils 4 have only sixteen turns, this being a much lower number than that used by any other meter of equal capacity now known to me at the present time. The cover which fits upon the meter fits tightly around the outside of the rib $29^A$ and is fastened upon the lower side of the base 31 by a suitable nut which is screwed to the extension of the cover that passes through the hole 41 in the front part of the meter-base.

My improvement also includes the manner of proportioning the axial length of the series coils 4, which consists of making or adjusting them so that their greatest axial length will be equal to the outside diameter of the cylinder, when the records of the meter follow an absolutely-straight line law. This fact, to my knowledge, has never before been made known or applied in practice, and is one of most importance in the construction of electric meters, since it has been impossible to produce them so that their rate of rotation would vary in absolutely the same ratio as the current passing through them, but would vary say two per cent. fast on one load, three per cent. slow on some other load and possibly four per cent. fast again on another.

What I claim is—

1. The combination with an electric meter of a vertical spindle carrying an armature and retarding fans, a vertical post adjustable in its bearing and having a jewel setting in a removable or separable part at its upper end upon which the said spindle rotates, and a cup shaped nut surmounting or covering said jewel and adjustable upon the said vertical post for the purpose set forth.

2. The combination with an electric meter, of a separable jewel setting 58, a jewel post or stud provided at its upper end with an adjustable inverted cup shaped nut 17, having a hole 60 on top through which the spindle passes, and mounted upon a suitable threaded portion of said stud, so that by raising it, it engages with the lower end of the spindle, thereby lifting it up out of the jewel in the said separable part 58 for the purpose set forth.

3. The combination with an electric meter, of a jewel post or stud 57, having a spiral spring 18 which presses against the cup nut 17 on top, and preventing it from moving when subjected to any vibration after being set or adjusted as herein set forth.

4. The combination with the field coils of an electric meter, of the punching, which consists of the extension fingers 26 for gripping said coils, and the slot 27 for adjusting said coils as herein set forth.

5. The combination with the motive part of an electric meter, for alternating currents, of a diverter consisting of a core of laminated sheet iron or steel, having at its center a hole through which passes the spindle, and provided with a coil of insulated wire at each end or pole as herein shown and for the purpose set forth.

6. The combination with an electric meter, of a diverter core built up from thin sheet iron punchings, and having a recess upon the periphery of the hole at its center into which fits a suitable pin or rod to prevent the diverter from turning as herein set forth.

7. In an electric meter the combination of the diverter coils 40, the energizing coils 4, the section of whose winding is that of a square or rectangle having all four sides of equal length and a vertical shaft passing between said coils which carries a closed revoluble cylindrical secondary armature of aluminum which is acted upon by the magnetism of said coils, and a retarding device for opposing the motion produced by said cylinder as and for the purpose set forth.

8. The combination in an electric meter of the series energizing coils 4, the section of whose winding is square or that of a rectangle having all four sides equal in length, the diverter coils, an armature mounted upon a vertical spindle and revoluble therewith and having a diameter equal in length to that of the axis of said energizing coils for the purpose set forth: a winged fan of aluminum mounted upon the same spindle as the said armature, and a registering train for indicating the amount of current or energy used.

9. In an electric meter for alternate currents, the combination with the motive part, of the series or energizing coils 4, approaching from opposite sides the cylindrical armature 6 within which is a diverter 40 and adjustable concentrically therewith, and an energizing circuit $a$ $b$ as herein shown and for the purpose set forth.

10. The combination in an electric meter for alternating currents of the inducing coils 4, the armature 6 revoluble between said coils 4, the diverter coils 40, and an impedance coil, which is connected in series with said diverter coils, the remaining terminals being shunted around the coils 4 as set forth.

11. In an electric meter for alternating currents, the combination with the vertical spindle, of an aluminum drum or cylinder, and two sets of magnetizing coils; said cylinder being revoluble between said coils and closely embraced by same, so that all the flux generated by these two coils, 4 and 40 will efficiently cut said drum for the purpose set forth.

Signed by me, at Fort Wayne, Allen county, State of Indiana, this 6th day of July, A. D. 1895.

THOMAS DUNCAN.

Witnesses:
ELTON J. KING,
BURLEIGH CURRIER.